(12) United States Patent
Muraki

(10) Patent No.: US 8,346,830 B2
(45) Date of Patent: Jan. 1, 2013

(54) DIGITAL SIGNAL PROCESSING APPARATUS

(75) Inventor: Yasuyuki Muraki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1107 days.

(21) Appl. No.: 12/255,588

(22) Filed: Oct. 21, 2008

(65) Prior Publication Data

US 2009/0106336 A1    Apr. 23, 2009

(30) Foreign Application Priority Data

Oct. 23, 2007 (JP) ................. 2007-275529

(51) Int. Cl.
*G06F 7/523* (2006.01)
(52) U.S. Cl. ...................................... 708/211
(58) Field of Classification Search ................. None
See application file for complete search history.

(56) References Cited

U.S. PATENT DOCUMENTS

| 4,276,607 | A | * | 6/1981 | Wong | 708/628 |
| 4,334,284 | A | * | 6/1982 | Wong | 708/503 |
| 2002/0026466 | A1 | * | 2/2002 | Ohashi et al. | 708/490 |
| 2005/0050372 | A1 | | 3/2005 | Hagiwara | |
| 2009/0106336 | A1 | * | 4/2009 | Muraki | 708/210 |

FOREIGN PATENT DOCUMENTS

| JP | 2000-057112 | 2/2000 |
| KR | 10-2006-0066081 A | 6/2006 |
| WO | WO-2005/029406 A2 | 3/2005 |

OTHER PUBLICATIONS

Notice of Preliminary Rejection for KR Patent Application No. 10-2008-103659, with English Translation, eight pages.
Chinese Office Action mailed Apr. 7, 2010, for CN Patent Application No. 2008-10167323.4, with English Translation, 12 pages.

\* cited by examiner

*Primary Examiner* — David H Malzahn
(74) *Attorney, Agent, or Firm* — Morrison & Foerster LLP

(57) ABSTRACT

Register includes flip-flop circuits each constructed to retain data of n bit in synchronism with a clock pulse, the register retaining a multiplication result of a multiplier dividedly by the flip-flop circuits, n bit per flip-flop circuit. For each of a first and second numeric value data to be multiplied by the multiplier, a control circuit detects the number of consecutive zeros from the lowest-order bit of the data and performs control, on the basis of the detected number of the consecutive zeros and for each flip-flop circuit, as to whether or not the clock pulse should be supplied to the flip-flop circuit. The control circuit obtains an integral quotient value x by dividing by the number n the sum between the detected numbers for the first and second numeric value data, to stop the clock pulse supply to a particular number x of flip-flop circuit counted from the lowest-order.

12 Claims, 5 Drawing Sheets

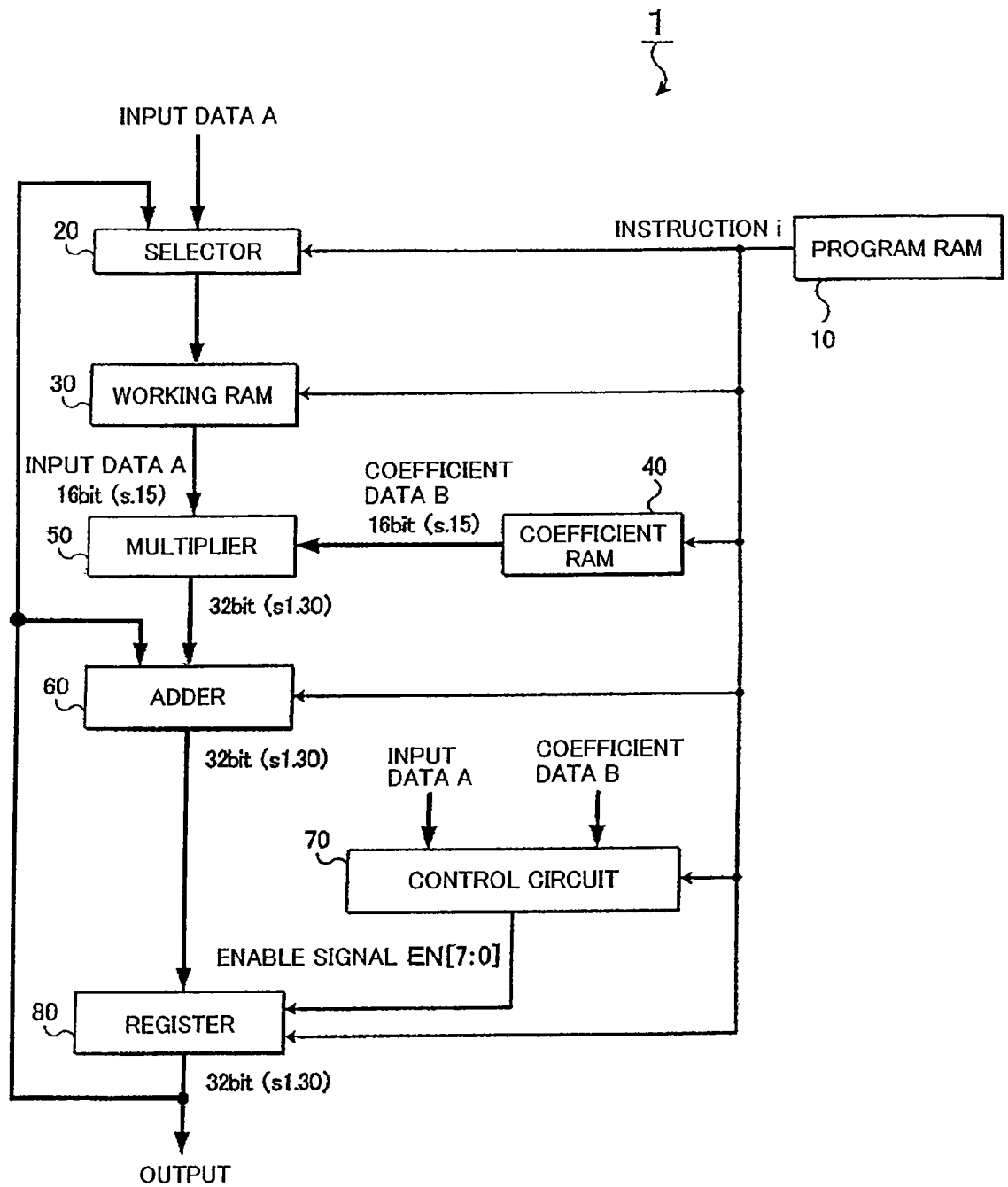
F I G. 1

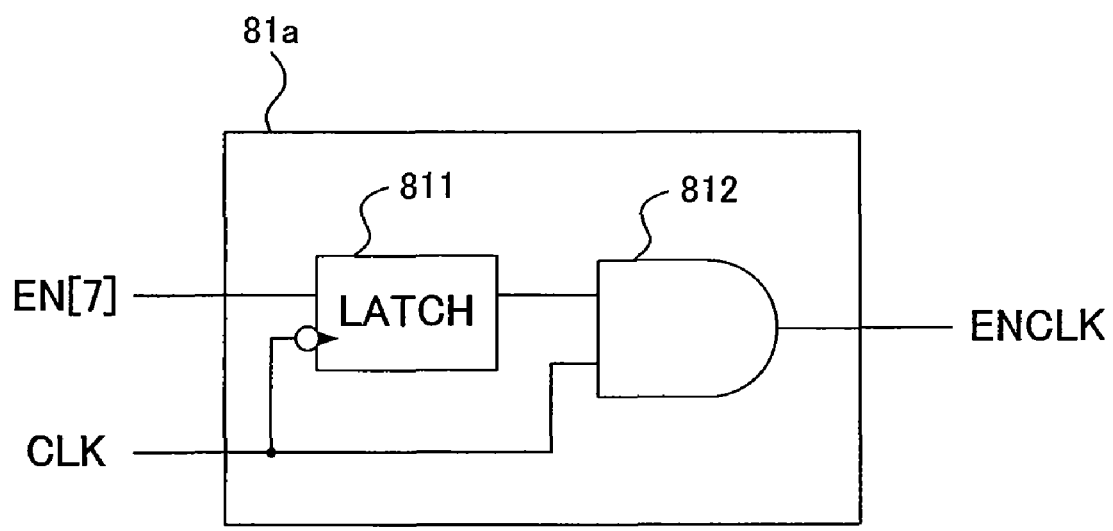
F I G. 3

DIGITAL SIGNAL PROCESSING APPARATUS

BACKGROUND

The present invention relates to an improved digital signal processing apparatus (hereinafter referred to as "DSP").

In Japanese Patent Application Laid-open Publication No. 2000-057112, for example, it is disclosed that clock pulses are supplied to an arithmetic operation section, including a multiplier, adder, resister, etc., only during a period when a DSP is executing an arithmetic instruction, and that the clock supply to the arithmetic processing section is stopped to deactivate the arithmetic processing section during another period when the DSP is not executing an arithmetic instruction and thereby reduce power consumption by the DSP (see particularly paragraph [0031] and FIG. 4 of the No. 2000-057112 publication).

With the DSP disclosed in the No. 2000-057112 publication, clock pulses would be supplied to various components of the arithmetic operation section throughout a period when the DSP is performing arithmetic operations, irrespective of the content of the arithmetic operations, as along as the arithmetic operations concern a process requested from outside the DSP. However, in a case where a multiplication result of two numeric value data is retained in a register, and if values of the lower four bits of one of the two numeric value data to be multiplied are all zero (0), for example, all values of the lower four bits of the multiplication result too will be "0". In such a case, further power consumption reduction will be achieved if the clock pulse supply to flip-flops for retaining the values of the lower four bits can be stopped.

SUMMARY OF THE INVENTION

In view of the foregoing, it is an object of the present invention to provide an improved digital signal processing apparatus which is capable of finely reducing the power consumption depending on the content of an arithmetic operation.

In order to accomplish the above-mentioned object, the present invention provides an improved digital signal processing apparatus, which comprises: a multiplier which multiplies first and second numerical value data; a register including a plurality of flip-flop circuits each constructed to retain data of n bit (where n is an integral number equal to or greater than one) in synchronism with a clock pulse, the register retaining a multiplication result of the multiplier dividedly by means of the plurality of flip-flop circuits, n bit per flip-flop circuit; a control circuit which, for each of the first and second numeric value data, detects the number of consecutive zeros (0s) from a lowest-order bit of the data and performs control, on the basis of the detected number of the consecutive zeros and for each of the plurality of flip-flop circuits, as to whether or not the clock pulse should be supplied to the flip-flop circuit; and a mask circuit which masks an output value of each of the flip-flop circuits, for which supply of the clock pulse has been stopped by the control circuit, with a zero value.

By detecting the number of consecutive zeros from the lowest-order (or least significant) bit of each of the first and second numeric value data to be multiplied by the multiplier, it is possible to know the number of consecutive zeros from the lowest-order bit of the multiplication result. Thus, if the multiplication result has consecutive zero values over at least n bit or more from the lowest-order bit, the control circuit can stop the supply of the clock pulse for (or to) one or more of the flip-flop circuits provided in the register, to thereby deactivate the one or more flip-flop circuits. Thus, power consumption by the digital signal processing apparatus can be effectively reduced.

As an example, the control circuit obtains an integral quotient value x by dividing, by the number n, a sum (a+b) between the number a of the consecutive zeros from the lowest-order bit of the first numerical value data and the number b of the consecutive zeros from the lowest-order bit of the second numerical value data, the control circuit stops the supply of the clock pulse to a particular number x of flip-flop-circuit counted from the lowest-order flip-flop-circuit of the plurality of flip-flop circuits in the register.

According to another aspect of the present invention, there is provided an improved digital signal processing apparatus, which comprises: an adder which adds together first and second numerical value data; a register including a plurality of flip-flop circuits each constructed to retain data of n bit (where n is an integral number equal to or greater than one) in synchronism with a clock pulse, the register retaining an addition result of the adder by means of the plurality of flip-flop circuits, n bit per flip-flop circuit; a control circuit which, for each of the first and second numeric value data, detects the number of consecutive zeros from a lowest-order bit of the data and performs control, on the basis of a smaller value of the detected numbers of the consecutive zeros and for each of the plurality of flip-flop circuits, as to whether or not the clock pulse should be supplied to the flip-flop circuit; and a mask circuit which masks an output value of each of the flip-flop circuits, for which supply of the clock pulse has been stopped by the control circuit, with a zero value.

By detecting the number of consecutive zeros from the lowest-order (or least significant) bit for each of the first and second numeric value data to be added together by the adder, it is possible to know the number of consecutive zeros from the lowest-order bit of the addition result (or sum). Thus, if the addition result has consecutive zero values over at least n bit or more from the lowest-order bit, it is possible to stop the supply of the clock pulse for (to) one or more of the flip-flop circuits provided in the register, to thereby deactivate the one or more flip-flop circuits. Thus, the power consumption by the digital signal processing apparatus can be effectively reduced.

As an example, the control circuit obtains an integral quotient value x by dividing the smaller value a of the detected numbers by the number n, and the control circuit stops the supply of the clock pulse to a particular number x of flip-flop-circuit counted from the lowest-order flip-flop-circuit of the plurality of flip-flop circuits in the register.

According to still another aspect of the present invention, there is provided an improved digital signal processing apparatus, which comprises: an arithmetic operator which performs an arithmetic operation with arithmetic precision designated by arithmetic precision designating data; a register including a plurality of flip-flop circuits each constructed to retain data of n bit (where n is an integral number equal to or greater than one) in synchronism with a clock pulse, the register retaining an arithmetic operation result of the arithmetic operator by means of the plurality of flip-flop circuits, n bit per flip-flop circuit; a control circuit which performs control, on the basis of the arithmetic precision designated by arithmetic precision designating data and for each of the plurality of flip-flop circuits, as to whether or not the clock pulse should be supplied to the flip-flop circuit; and a mask circuit which masks an output value of each of the flip-flop circuits, for which supply of the clock pulse has been stopped by the control circuit.

According to the present invention, of the plurality of flip-flop circuits provided in the register, it is possible to stop the supply of the clock pulse for each flip-flop circuit unnecessary for arithmetic precision required of the arithmetic operator, to thereby deactivate the flip-flop circuit. Thus, the power consumption by the digital signal processing apparatus can be effectively reduced.

As an example, in the arithmetic operation performed by the arithmetic operator, a particular number a of bit counted from the lowest-order bit is discarded in accordance with the arithmetic precision designating data, and the control circuit obtains an integral quotient x by dividing the number a by the number n and stops the supply of the clock pulse to a particular number x of flip-flop-circuit counted from the lowest-order flip-flop-circuit of the plurality of flip-flop circuits in the register.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a block diagram showing a general setup of a DSP according to a first embodiment of the present invention;

FIG. 3 is a circuit diagram showing a construction of a clock gating cell employed in the first embodiment;

DETAILED DESCRIPTION

First Embodiment

Figure 2:
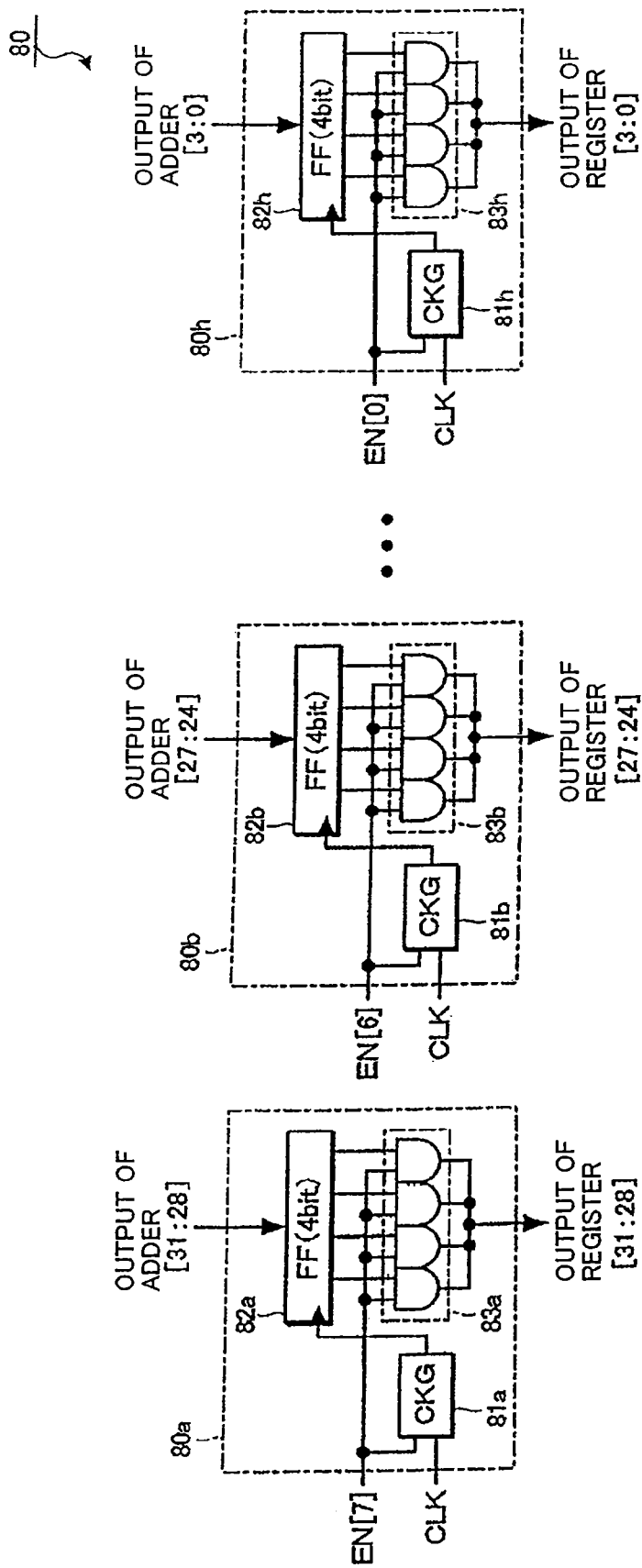
FIG. 2 is a circuit diagram showing a construction of a register employed in the first embodiment.

FIG. 1 is a block diagram showing a general setup of a DSP 1 according to a first embodiment of the present invention. The DSP 1 shown in the figure is provided, for example, in a tone generator board that is in turn provided in a personal computer or the like, and it performs predetermined programmed arithmetic operations, such as those pertaining to a tone reproduction process, conversion process between analog and digital sound signals, filtering process, mixing process, etc.

The DSP 1 includes a program RAM (Random Access Memory) 10, a selector 20, a working RAM 30, a coefficient RAM 40, a multiplier 50, an adder 60, a control circuit 70 and a register 80, and clock pulses are supplied from outside to these components 10, 20, 30, 40, 50, 60, 70 and 80. In the program RAM 10, there are prestored instructions i for controlling the various components of the DSP 1. These instructions i include control instructions for controlling input/output etc. of data in addition to arithmetic instructions related directly to arithmetic operations, such as multiplications and additions.

Once data A is input, the DSP 1 stores the input data A into the working RAM 30 via the selector 20. Output data from the register 80 too is fed back to the selector 20, and the selector 20 selects one of the input data A and the output data from the register 80 in accordance with a particular instruction i and supplies the selected data to the working RAM 30. Namely, not only the input data A but also the output data from the register 80 can be stored in the working RAM 30, and thus, the input data A can be subjected to complicated arithmetic processing, such as a filtering process performed with a given characteristic and a subsequent filtering process performed with another characteristic.

Data read out from the working RAM 30 is supplied to the multiplier 50, where the data is multiplied by coefficient data B read out from the coefficient RAM 40. In the coefficient RAM 40, there are prestored, as coefficient data B, predetermined coefficients corresponding to a programmed arithmetic processing function, such as tap coefficients of an FIR (Finite Impulse Response) filter etc.

"Input Data A 16 bit (s.15)" shown in FIG. 1 means that the input data A is a 16-bit data where the highest-order (or most significant) bit is a sign bit and the other 15 (fifteen) bits following the sign bit represent a value after the decimal point. The sign bit indicates whether the input data represents a positive value or a negative value. Therefore, in the illustrated example of FIG. 1, the input data A can take a value equal to or greater than "−1(0x8000)" but smaller than "+1 (0x7FFF)". The same can be said for "Coefficient Data B 16 bit (s.15)" shown in FIG. 1, and the coefficient data B can take a value equal to or greater than "−1(0x8000)" but smaller than "+1 (0x7FFF)" similarly to the input data A. Note that "0x" means the data is in the hexadecimal representation.

Further, "32 bit (s1.30)" shown below the multiplier 50 in FIG. 1 means that output data from the multiplier 50 is 32-bit data where the highest-order bit is a sign bit, one bit following the sign bit represents an integral value and the other 30 bits following the one bit represent a value after the decimal point. Therefore, in the illustrated example of FIG. 1, the output data from the multiplier 50 can take a value equal to or greater than "−2(0x40000000)" but smaller than "+2(0x3FFFFFFF)". In FIG. 1, "32 bit (s1.30)" is also shown below the adder 60 and register 80, which means that the output data from the adder 60 and register 80 can each take a value equal to or greater than "−2(0x40000000)" but smaller than "+2(0x3FFF-FFFF)".

The output data from the multiplier 50 is supplied to one of input terminals of the adder 60, while the output data from the register 80 is fed back to the other input terminal of the adder 60. The adder 60 adds together these numerical value data supplied to the two input terminals. Then, the output data from the adder 60 is supplied to the register 80. As will be later detailed, the register 80 includes a total of eight flip-flops (i.e., parallel-input/parallel-output 4-bit flip-flop circuits) each constructed to retain four-bit data in synchronism with a clock pulse. Namely, the register 80 retains the multiplication result of the multiplier 50 dividedly by means of the plurality of flip-flop circuits, n bit per flip-flop circuit.

Further, the DSP 1 shown in FIG. 1 is capable of performing only the multiplication process using the multiplier 50 while skipping the addition process using the adder 60, and then supplying the multiplication result of the multiplier 50 to the register 80 by way of the adder 60. In the case where only the multiplication process using the multiplier 50 is performed and the multiplication result of the multiplier 50 is retained by the register 80, and if the input data A is "0x7F00" (111111100000000) and the coefficient data B is "0x4320" (100001100100000), the lower eight bits of the input data A are all "0" while the lower five bits of the coefficient data B are "0". In this case, the multiplication result is "0x214CE000"

(10000101001100111000000000000000) with the lower thirteen bits all taking the value "0". Thus, in the case where the register 80 comprises eight flip-flops (4-bit flip-flop circuits) as noted above, the supply of the clock pulse to the three flip-flops for retaining values of the lower twelve bits can be stopped to thereby reduce power consumption.

Thus, in the case where only the multiplication process using the multiplier 50 is performed and the multiplication result is retained by the register 80, the input data A and coefficient data B supplied to the multiplier 50 are also supplied to the control circuit 70, so that the control circuit 70 first detects, for the supplied input data A and coefficient data B, the total number of consecutive 0s (zeros) from the respective lowest-order bits. For example, in the case where the input data A is "0x7F00" and the coefficient data B is "0x4320" as noted above, the number of consecutive 0s (zeros) from the lowest-order bit in the input data A is eight, and the number of consecutive 0s from the lowest-order bit in the coefficient data B is five, and thus, the control circuit 70 detects "13 (thirteen)" as the total number of 0s.

After that, the control circuit 70 sets a value of an enable signal EN[7:0] on the basis of the detected total number of "0" and then supplies the thus-set value to the register 80. The enable signal EN[7:0] is a signal that determines, separately for each of the eight flip-flops of the register 80, whether or not a clock pulse should be supplied to the flip-flop. For example, in the case where the detected number of 0s is "13" as noted above, the control circuit 70 sets the value of the lower three bits of the enable signal EN[7:0] at "0" in order to stop the clock pulse supply to the three flip-flops retaining the lower 12 bits in the eight flip-flops of the register 80. Namely, in this case, the value of the enable signal EN[7:0] is set at "11111000".

More specifically, the control circuit 70 sets the value of the enable signal EN[7:0] at "11111111" in the case where the detected number of 0s is in the range of "0"-"3", at "11111110" in the case where the detected number of 0s is in the range of "4"-"7", at "11111100" in the case where the detected number of 0s is in the range of "8"-"11", and at "10000000" in the case where the detected number of 0s is in the range of "28"-"31". Namely, if the number of consecutive 0s from the lowest-order bit in the input data A (first numerical value data) is represented by "a" and the number of consecutive 0s from the lowest-order bit in the coefficient data B (second numerical value data) is represented by "b", the control circuit 70 divides the sum of a+b ("13" in the above-mentioned example) by the number of bits n ("4" in the above-mentioned example) per flip-flop circuit, to thereby obtain an integral quotient value x ("3" in the above-mentioned example). Thus, the control circuit 70 stops the clock pulse supply to a predetermined number x (which is an integral number) of flip-flop circuits from the lowest-order flip-flop circuit in the register 80.

FIG. 2 is a circuit diagram showing the construction of the register 80. As shown in the figure, the register 80 includes eight retaining circuits 80a, 80b, . . . , 80h for sequentially retaining eight groups of four bits (i.e., eight 4-bit groups), starting with the highest-order bit, of 32-bit data supplied from the adder 60; namely, the register 80 retains the supplied 32-bit data by means of the retaining circuits 80a, 80b, . . . , 80h, four bits per retaining circuit. Namely, the retaining circuit 80a retains data of four bits from the highest-order bit, i.e. output data [31:28], of the output data [31:0] supplied from the adder 60. The retaining circuit 80b retains data of the fifth bit to the eighth bit counted from the highest-order bit, i.e. output data [27:24], of the supplied output data [31:0].

Further, the retaining circuit 80h retains data of other four bits including the lowest-order bit, i.e. output data [3:0], of the supplied output data [31:0].

Although not particularly shown, five other retaining circuits are provided between the retaining circuit 80b and the retaining circuit 80h, which are constructed similarly to the aforementioned retaining circuit 80a, 80b and 80h. If retaining circuits 80c, 80d, 80e, 80f and 80g are sequentially provided, as the five other retaining circuits, at a stage following the retaining circuit 80b, output data [23:20] of the output data [31:0] supplied from the adder 60 are retained by the retaining circuit 80c, output data [19:16] of the supplied output data [31:0] are retained by the retaining circuit 80d, output data [15:12] of the supplied output data [31:0] are retained by the retaining circuit 80e, output data [11:08] of the supplied output data [31:0] are retained by the retaining circuit 80f, and output data [07:04] of the supplied output data [31:0] are retained by the retaining circuit 80g.

Because the eight retaining circuits 80a-80h constituting the register 80 have basically the same circuit construction, the circuit construction of the retaining circuit 80a will be described below as a representative example. The retaining circuit 80a includes a clock gating cell (CKG) 81a, a flip-flop (FF) 82a, and a mask circuit 83a. The FF 82a is a parallel-input/parallel-output 4-bit flip-flop circuit.

The CKG 81a is supplied with not only a clock pulse CLK from outside the DSP 1 but also an enable signal EN[7] from the control circuit 70. The CKG 81a is a circuit that determines, in accordance with the value of the enable signal EN[7], whether or not the clock pulse CLK should be supplied to the FF 82a, and it has a circuit construction as shown in FIG. 3. In FIG. 3, a latch circuit 811 latches the value (0 or 1) of the enable signal EN[7] in synchronism with the falling edge of the clock pulse CLK, and it then outputs the latched value to an AND circuit 812. The AND circuit 812 outputs a logical AND between the output value from the latch circuit 811 and the clock pulse CLK. Thus, when the CKG 81a is supplied with "1" as the value of the enable signal EN[7], it continues to supply the clock pulse ENCLK to the FF82a until it is supplied with "0" as the value of the enable signal EN[7].

Once the CKG 81a is supplied with "0" as the value of the enable signal EN[7], the CKG 81a stops the supply of the clock pulse ENCLK to the FF 82a until "1" is supplied as the value of the enable signal EN[7].

Referring back to FIG. 2, the FF 82a retains the output data [31:28] supplied from the adder 60 in synchronism with the clock pulse ENCLK supplied from the CKG 81a and then outputs the thus-retained output data at predetermined timing. Once the supply of the clock pulse ENCLK is stopped, the FF 82a stops operating (i.e., is deactivated); however, because data written in the FF 82a immediately before the clock supply stop is still retained in the FF82a, the mask circuit 83a is provided, at a stage following the FF 82a, in order to prevent the retained value from being output as a register output [31:28]. The mask circuit 83a, which comprises four AND circuits, masks all of the 4-bit data, output from the FF 82a, with "0" when the value of the enable signal EN[7] is "0", but directly outputs the 4-bit data, output from the FF82a, as a register output [31:28] when the value of the enable signal EN[7] is "1".

Next, a description will be given about behavior of the DSP 1. First, the following lines describe behavior of the DSP 1 in connection with a case where the input data A "0x7F00" is multiplied by the coefficient data B "0x4320" by the multiplier 50 and the result of the multiplication is retained by the register 80.

In this case, the input data "0x7F00" and coefficient data "0x4320" are supplied to the multiplier 50, which performs multiplication between the two supplied data to thereby obtain a multiplication result "0x214CE000". Meanwhile, the same input data "0x7F00" and coefficient data "0x4320" are also supplied to the control circuit 70. The control circuit 70 detects, for the input data A and coefficient data B, the total number of consecutive 0s (zeros) from the respective lowest-order bits. In this case, the control circuit 70 obtains a detected value "13" as the total number of 0s because the input data A has eight consecutive 0s from the lowest-order bit while the coefficient data B has five consecutive 0s form the lowest-order bit.

Then, on the basis the detected value "13", the control circuit 70 sets the value of the enable signal EN[7:0] at "11111000" and supplies the thus-set value to the register 80. As a consequence, the register 80 stops the supply of the clock pulse ENCLK for (to) the three FFs 82f, 82g and 82h (of the eight FFs 82a-82h) which retain values of the lower twelve bits. When the multiplication result "0x214CE000U" of the multiplier 50 is to be retained by the register 80, only the data of the upper twenty bits of the 32-bit data are retained by the FFs 82a-82e with the data of the lower twelve bits left unretained by the register 80.

Then, when the multiplication result retained by the register 80 is to be output, the data are output from the eight FFs 82a-82h, at which time, however, all of the output values (of the lower twelve bits) from the FFs 82f-82h are masked with 0s by the mask circuits 83f-83h provided at the stage following the FFs 82f-82h. The reason why the output values from the FFs 82f-82h are masked with 0s is to prevent the data, written prior to deactivation of the FFs 82f-82h responsive to the supply stoppage of the clock pulse ENCLK and still retained in the FFs 82f-82h, from being output as a register output [11:0].

Namely, in the case where the result of the multiplication between the input data A "0x7F00" and the coefficient data B "0x4320" is retained by the register 80, the supply of the clock pulse ENCLK to the FFs 82f-82h can be stopped to deactivate these three FFs 82f-82h during the time period when the multiplication result is retained by the register 80; thus, the power consumption by the DSP 1 can be effectively reduced.

The following lines describe behavior of the DSP 1 in connection with a case where input data A "0x7F10" (111111100010000) and coefficient data B "0x4321" (100001100100001) are multiplied by the multiplier 50 and the multiplication result "0x21519110" (10000101-0100011001000100010000) is retained by the register 80. In this case, the total number of consecutive 0s from the lowest-order bit of the input data A is "4" (four), while the total number of consecutive 0s from the lowest-order bit of the coefficient data B is "0" (zero). Thus, the control circuit 70 detects "4" as the total number of consecutive zeros and sets the value of the enable signal EN[7:0] at "11111110".

As a consequence, the register 80 stops the supply of the clock pulse ENCLK to the FF 82h alone. Thus, when the multiplication result "0x21519110" of the multiplier 50 is to be retained by the register 80, only the data of the upper twenty eight bits of the 32-bit data are retained by the FFs 82a-82g with the data of the lower four bits left unretained by the register 80. When the multiplication result retained by the register 80 is to be output, only output values from the FF 82h corresponding to the lower four bits are all masked with 0s by the mask circuit 83h provided at the stage following the FF 82h. Thus, the supply of the clock pulse ENCLK to the FF 82h can be stopped to deactivate the FF 82h during the time period when the multiplication result is retained by the register 80; thus, the power consumption by the DSP 1 can be effectively reduced.

In a case where the value of the input data A or coefficient data B is "0", the multiplication result too takes a value "0", and thus, the control circuit 70 sets the value of the enable signal EN[7:0] at "00000000" regardless of the total number of 0s. In this case, the register 80 can stop the supply of the clock pulse ENCLK to all of the FFs 82a-82h and thereby deactivate all of the FFs 82a-82h.

Namely, when the multiplication result of the multiplier 50 is to be retained by the register 80 and if the multiplication result has consecutive 0s over at least four bits or more from the lowest-order bit, the above-described embodiment can stop the supply of the clock pulse ENCLK to one or more flip-flops of the register 80 to thereby deactivate the one or more flip-flops. As a result, the instant embodiment can effectively reduce the power consumption by the DSP 1.

Second Embodiment

Figure 4:
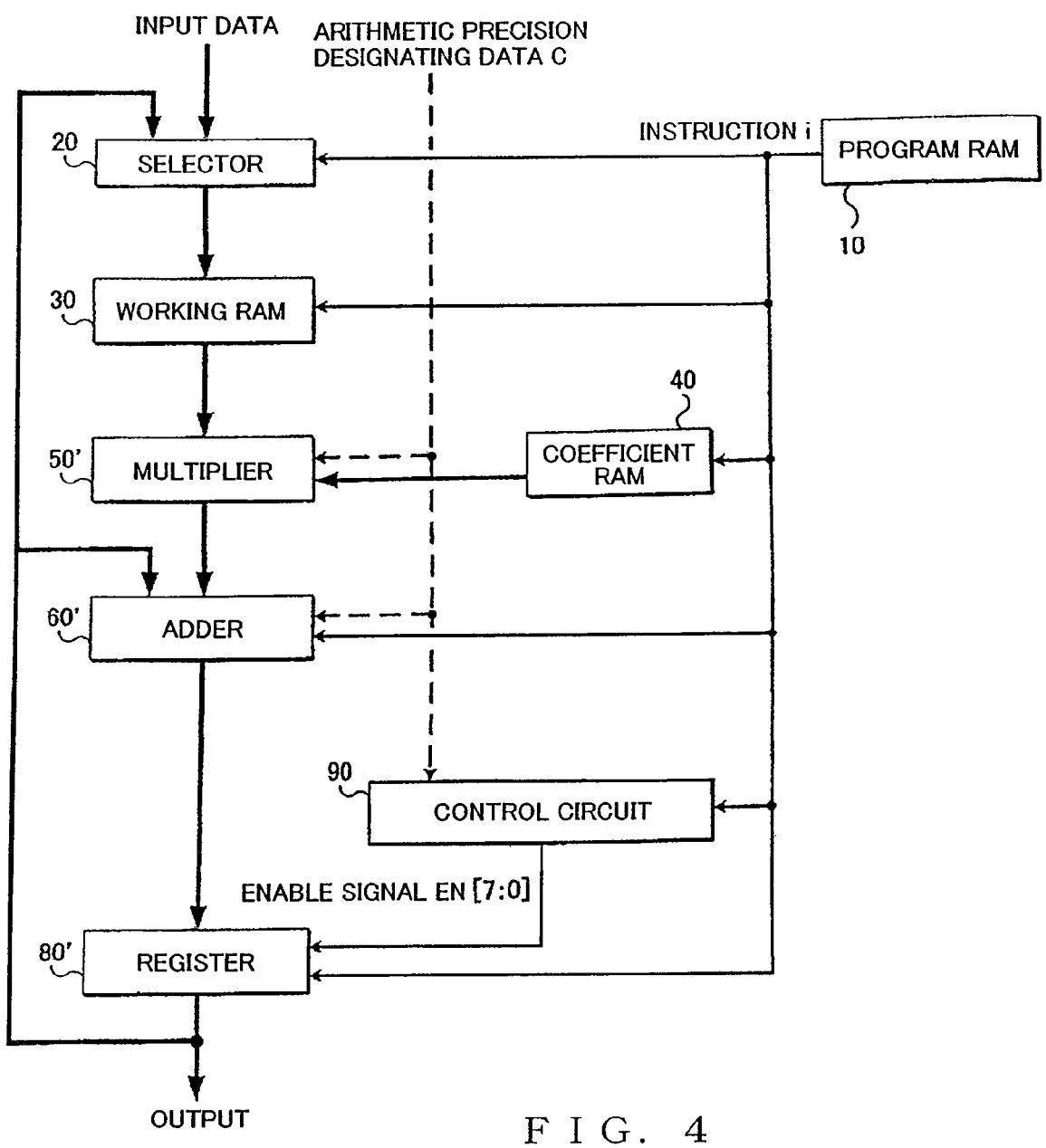
FIG. 4 is a block diagram showing a general setup of a DSP according to a second embodiment of the present invention.

FIG. 4 is a block diagram showing a general setup of a DSP 2 according to a second embodiment of the present invention. Similar elements to those in the first embodiment are indicated by the same reference numerals and characters as used for the first embodiment.

In order to perform predetermined arithmetic operations, such as those pertaining to a tone reproduction process, conversion process between analog and digital sound signals, filtering process, mixing process, etc., arithmetic precision required of a multiplier 50' and adder 60' in the DSP 2 is caused to vary in accordance with the type of the process, sampling rate, etc. For example, even where the multiplier 50' and adder 60' have a maximum arithmetic capability of thirty bits after the decimal point, only fourteen bits after the decimal point may sometimes be sufficient as the arithmetic precision required of the multiplier 50' and adder 60'; in other cases, the arithmetic precision required of the multiplier 50' and adder 60' must be thirty bits after the decimal point.

Therefore, where the arithmetic precision required of the multiplier 50' and adder 60' is "16 bit (sl.14)", the DSP 2 stops the supply of the clock pulse ENCLK to four FFs 82e-82h, retaining data of the lower sixteen bits, of the eight FFs 82a-82h in a register 80' capable of retaining data of a total of thirty-two bits, to thereby deactivate the four FFs 82e-82h.

In FIG. 4, arithmetic precision designating data C is data for designating arithmetic precision to the multiplier 50' and adder 60'. Once the arithmetic precision designating data C is supplied, the multiplier 50' and adder 60' perform numeric operations with the arithmetic precision designated by the arithmetic precision designating data C. The arithmetic precision designating data C is also supplied to a control circuit 90.

Designation, to the multiplier 50' and adder 60', of the arithmetic precision can be made, for example, via firmware of the DSP 2. Further, when an effective bit length of numeric value data to be input to the DSP 2 has been designated, information indicative of the effective bit length may be used as the arithmetic precision designating data C. Further, although FIG. 4 shows a case where the arithmetic precision designating data C is input from outside the DSP 2 and supplied to the multiplier 50', adder 60' and control circuit 90, a data table indicating correspondency between various arithmetic precision designating data C and types of processes may be prestored in the program RAM 10 so that, each time a process is to be performed, one of the arithmetic precision designating data C that corresponds to the type of the process to be performed can be read out from the table and supplied to the multiplier 50', adder 60' and control circuit 90. In another alternative, bit data designating particular arithmetic precision may be included in each of instructions (arithmetic instructions and control instructions) i stored in the program RAM 10 so that the arithmetic precision designating data C corresponding to the bit data is supplied to the multiplier 50', adder 60' and control circuit 90. Namely, one arithmetic precision designating data C may be designated per arithmetic operation, per sub routine or per process.

Further, the multiplier 50' and adder 60' may be constructed in such a manner that, once arithmetic precision designating data $C_1$ is supplied, they repetitively perform numeric operations with the arithmetic precision designated by the arithmetic precision designating data $C_1$ until other arithmetic precision designating data $C_2$ is supplied.

Once arithmetic precision designating data C is supplied, the control circuit 90 determines a value of the enable signal EN[7:0] on the basis of the arithmetic precision designated by the arithmetic precision designating data C and supplies the determined value to the register 80'. For example, if the supplied arithmetic precision designating data C is "16 bit (sl.14)" as noted above, the value of the enable signal EN[7:0] is set at "11110000" in order to stop the supply of the clock pulse ENCLK to four FFs 82e-82h (of the eight FFs 82a-82h provided in the register 80') which retain the lower sixteen bits. Namely, in arithmetic operations by the arithmetic operators (50' and 60'), a particular number a (a=16 in the above-mentioned example) of bits counted from the lowest-order bit will be discarded. The control circuit 90 divides the value "a" by the number n ("4" in the above-mentioned example) of bits per flip-flop circuit, to thereby obtain an integral quotient value x ("4" in the above-mentioned example). Thus, the control circuit 90 stops the clock pulse supply to the x flip-flop circuits counted from the lowest-order flip-flop circuit in the register 80'.

In this case, the register 80' stops the supply of the clock pulse ENCLK to the four FFs 82e-82h. Thus, when the result of the arithmetic operations [16 bit (sl.14)] by the multiplier 50' and adder 60' is to be retained by the register 80', the result of the arithmetic operations is retained by the FFs 82a-82d. Further, when the arithmetic operation result retained by the register 80' is to be output, the data are output from the eight FFs 82a-82h, at which time, however, all of the output values (of the lower sixteen bits) from the FFs 82e-82h are masked.

In the above-described first embodiment, the output values from the flip-flops, for which the supply of the clock pulse ENCLK has been stopped, are masked with the value "0". In the second embodiment, on the other hand, the output values from the flip-flops, for which the supply of the clock pulse ENCLK has been stopped, are masked by being deleted or nulled (i.e., made zero), instead of being made zero, because the output values are data unnecessary for the required arithmetic precision. Namely, the register 80' employed in the instant embodiment differs from the register 80 employed in the first embodiment in that, when the output values from the flip-flops, not necessary for the required arithmetic precision, are to be masked by the mask circuits, they are deleted or nulled.

Namely, in the second embodiment, the supply of the clock pulse ENCLK can be stopped for each of the flip-flops 82a-82h which is not necessary for the arithmetic precision required of the multiplier 50' and adder 60', to thereby deactivate the flip-flop. In this way, the power consumption by the DSP 2 can be effectively reduced.

Modification

It should be noted that the present invention is not limited to the above-described embodiments and may be modified variously as set forth by way of example.

(1) Consider a case where a sum (i.e., result of addition) between two numerical value data is retained by the register 80. If the values of the lower seven bits of one of the numerical value data are all "0" and the values of the lower four bits of the other numerical value data are all "0", then at least the lower four bits of the addition result all take a value "0". In such a case, it is possible to stop the supply of the clock pulse ENCLK to one FF 82h of the eight flip-flops 82a-82h, provided in the register 80, which retains the values of the lower four bits, and thus, the power consumption can be effectively reduced.

Figure 5:
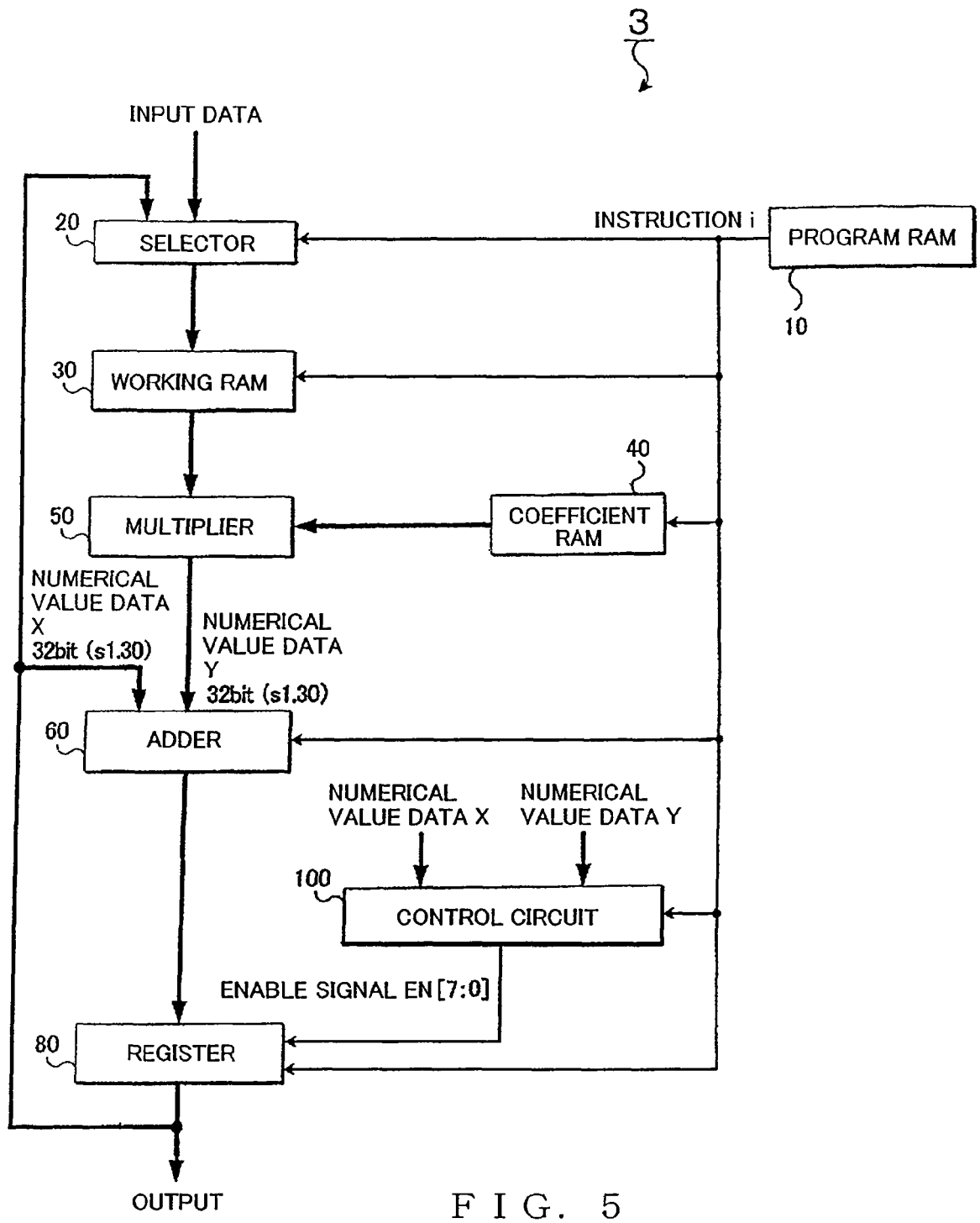
FIG. 5 is a block diagram showing a general setup of a DSP according to a modification of the present invention.

FIG. 5 is a block diagram showing a general setup of a DSP 3 according to a modification of the present invention. Similar elements to those in the first embodiment are indicated by the same reference numerals and characters as used for the first embodiment. In the DSP 3, two numerical value data X and Y supplied to the adder 60 are also supplied to a control circuit 100, and, for each of the numerical value data X and Y, the control circuit 100 detects the number of consecutive 0s from the lowest-order bit. Then, the control circuit 100 selects the smaller value of the two detected numbers of the consecutive 0s and sets the selected value as a final detected value. If the detected two numbers are identical to each other, the control circuit 100 selects either one of the detected two numbers as a final detected value.

In a case where the numerical value data X is "0x214CE000" (10000101001100111000000000000000) while the numerical value data Y is "0x00007F00" (00000000000000000111111100000000), for example, the number of consecutive 0s from the lowest-order bit in the numerical value data X is thirteen while the number of consecutive 0s from the lowest-order bit in the numerical value data Y is eight, and thus, the control circuit 100 obtains "8" as a final detected value by comparing these two numbers. Note that, in this case, the sum between the numerical value data X and Y is "0x2144D5F00" (1000010100110101011111000000000), where the lower eight bits all take the value "0". Namely, the control circuit 100 divides the smaller value a (a=8 in the above-mentioned example) of the two detected numbers by the number n (n=4 in the above-mentioned example) of bits per flip-flop circuit, to thereby obtain an integral quotient value x ("2" in the above-mentioned example). Thus, the control circuit 100 stops the clock pulse supply to the number x of flip-flop circuits counted from the lowest-order flip-flop circuit in the register 80.

After that, the control circuit 100 determines a value of the enable signal EN[7:0] on the basis of the final detected value and supplies the thus-determined value to the register 80. For example, if the final detected value is "8", the value of the enable signal EN[7:0] is set at "11111100" in order to stop the supply of the clock pulse ENCLK to two flip-flops FFs 82g and 82h retaining the lower eight bits in the register 80 having the eight FFs 82a-82h.

Namely, when the enable signal EN[7:0] has been set at "11111100", the register 80 stops the supply of the clock pulse ENCLK to the two flip-flops FFs 82g and 82h. When the sum or addition result "0x214D5F00" of the adder 60 is to be retained by the register 80, only the data of the upper twenty-four bits of the 32-bit data are retained by the FFs 82a-82f with the data of the lower eight bits left unretained by the register 80. When the addition result retained by the register 80 is to be output, only the output values from the FFs 82g and 82h corresponding to the lower eight bits are masked with 0s by mask circuits 83g and 83h provided at the stage following the FFs 82g and 82h. Thus, the supply of the clock pulse ENCLK to the FFs 82g and 82h can be stopped to deactivate the FFs 82g and 82h during the time period when the addition result is retained by the register 80; thus, the power consumption by the DSP 3 can be effectively reduced.

Namely, when the sum or addition result of the adder 60 is to be retained by the register 80, and if the addition result has consecutive 0s over at least four bits or more from the lowest-order bit, the instant modification can stop the supply of the clock pulse ENCLK to one or more flip-flops of the register 80 to thereby deactivate the one or more flip-flops. As a result, the instant modification can reduce the power consumption by the DSP 3.

(2) The first and second embodiments and the modification have each been described above in relation to the case where an arithmetic operation result of the multiplier and adder is retained by the register in four-bit groups. Alternatively, the arithmetic operation result of the multiplier and adder may be retained by the register in three-bit, five-bit or one-bit groups. For example, in the case where the arithmetic operation result is retained by the register in three-bit groups, it is only necessary that the register be provided with a plurality of flip-flops each retaining three-bit data in synchronism with a clock pulse. Further, in the case where the arithmetic operation result is retained by the register in one-bit groups, it is only necessary that the register be provided with a plurality of flip-flops each retaining one-bit data in synchronism with a clock pulse.

Further, the present invention is applicable not only to tone/voice processing digital signal processing apparatus but also to image processing digital signal processing apparatus.

This application is based on, and claims priority to, JP PA 2007-275529 filed on 23 Oct. 2007. The disclosure of the priority application, in its entirety, including the drawings, claims, and the specification thereof, is incorporated herein by reference.

What is claimed is:

1. A digital signal processing apparatus comprising:
a multiplier which multiplies first and second numerical value data;
a register including a plurality of flip-flop circuits each constructed to retain data of n bit (where n is an integral number equal to or greater than one) in synchronism with a clock pulse, said register retaining a multiplication result of said multiplier by means of said plurality of flip-flop circuits, n bit per flip-flop circuit;
a control circuit which, for each of said first and second numeric value data, detects a number of consecutive zeros from a lowest-order bit of the data and performs control, on the basis of the number of the consecutive zeros detected by the control circuit and for each of said plurality of flip-flop circuits, as to whether or not the clock pulse should be supplied to the flip-flop circuit; and
a mask circuit which masks an output value of each of the flip-flop circuits, for which supply of the clock pulse has been stopped by said control circuit, with a zero value.

2. The digital signal processing apparatus as claimed in claim 1 wherein said control circuit obtains an integral quotient value x by dividing, by the number n, a sum (a+b) between a number "a" of the consecutive zeros from the lowest-order bit of said first numerical value data and a number "b" of the consecutive zeros from the lowest-order bit of said second numerical value data, and said control circuit stops the supply of the clock pulse to a particular number x of flip-flop-circuit counted from a lowest-order flip-flop-circuit of said plurality of flip-flop circuits in said register.

3. A digital signal processing apparatus comprising: an adder which adds together first and second numerical value data; a register including a plurality of flip-flop circuits each constructed to retain data of n bit (where n is an integral number equal to or greater than one) in synchronism with a clock pulse, said register retaining an addition result of said adder by means of said plurality of flip-flop circuits, n bit per flip-flop circuit; a control circuit which, for each of said first and second numeric value data, detects a number of consecutive zeros from a lowest-order bit of the data and performs control, on the basis of a smaller value of the detected numbers of the consecutive zeros and for each of said plurality of flip-flop circuits, as to whether or not the clock pulse should be supplied to the flip-flop circuit; and a mask circuit which masks an output value of each of the flip-flop circuits, for which supply of the clock pulse has been stopped by said control circuit, with a zero value.

4. The digital signal processing apparatus as claimed in claim 3 wherein said control circuit obtains an integral quotient value x by dividing the smaller value a of the detected numbers by the number n, and said control circuit stops the supply of the clock pulse to a particular number x of flip-flop-circuit counted from a lowest-order flip-flop-circuit of said plurality of flip-flop circuits in said register.

5. A digital signal processing apparatus comprising: an arithmetic operator which performs an arithmetic operation with arithmetic precision designated by arithmetic precision designating data; a register including a plurality of flip-flop circuits each constructed to retain data of n bit (where n is an integral number equal to or greater than one) in synchronism with a clock pulse, said register retaining an arithmetic operation result of said arithmetic operator by means of said plurality of flip-flop circuits, n bit per flip-flop circuit; a control circuit which performs control, on the basis of the arithmetic precision designated by arithmetic precision designating data and for each of said plurality of flip-flop circuits, as to whether or not the clock pulse should be supplied to the flip-flop circuit; and a mask circuit which masks an output value of each of the flip-flop circuits, for which supply of the clock pulse has been stopped by said control circuit.

6. The digital signal processing apparatus as claimed in claim 5 wherein, in the arithmetic operation performed by said arithmetic operator, a particular number a of bit counted from a lowest-order bit is discarded in accordance with the arithmetic precision designating data, and said control circuit obtains an integral quotient value x by dividing the number a by the number n and stops the supply of the clock pulse to a particular number x of flip-flop-circuit counted from a lowest-order flip-flop-circuit of said plurality of flip-flop circuits in said register.

7. The digital signal processing apparatus as claimed in claim 5 wherein the arithmetic precision designating data is supplied by firmware of said digital signal processing apparatus.

8. The digital signal processing apparatus as claimed in claim 5 wherein the arithmetic precision designating data is determined depending on an effective bit length of data input to said digital signal processing apparatus.

9. The digital signal processing apparatus as claimed in claim 5 wherein a table storing the arithmetic precision designating data corresponding to a type of said arithmetic operator is stored in a program memory of said digital signal processing apparatus.

10. The digital signal processing apparatus as claimed in claim 5 wherein each of instructions stored in a program memory of said digital signal processing apparatus includes bit data designating arithmetic precision, and, when any one of the stored instructions is to be executed, the arithmetic precision designating data is generated on the basis of the bit data designating the arithmetic precision.

11. The digital signal processing apparatus as claimed in claim 5 wherein, once the arithmetic precision designating data is supplied to designate the arithmetic precision, said arithmetic operator performs an arithmetic operation while maintaining the arithmetic precision, designated by the arithmetic precision designating data, until other arithmetic precision designating data is supplied.

12. The digital signal processing apparatus as claimed in claim 5 wherein said mask circuit deletes or nulls an output value of each of the flip-flop circuits for which said control circuit has stopped the supply of the clock pulse.

* * * * *